United States Patent

Krafft

[11] Patent Number: 5,772,086
[45] Date of Patent: Jun. 30, 1998

[54] PARTICULATE DISPENSER

[76] Inventor: Randall Krafft, 4951-B E. Adamo, Dr., Ste.238, Tampa, Fla. 33605

[21] Appl. No.: 840,087

[22] Filed: Apr. 9, 1997

[51] Int. Cl.[6] ................................................... G01F 11/46
[52] U.S. Cl. ........................................ 222/438; 222/450
[58] Field of Search .................................. 222/158, 154, 222/424.5, 425, 434, 435, 438, 439, 450, 451, 452, 543

[56] References Cited

U.S. PATENT DOCUMENTS

| | | | |
|---|---|---|---|
| 2,877,937 | 3/1959 | Weir | 222/452 |
| 2,887,254 | 5/1959 | Menderman | 222/450 |
| 3,201,009 | 8/1965 | Smith | 222/452 X |
| 3,207,371 | 9/1965 | Stone | 222/452 X |
| 3,912,126 | 10/1975 | Harshberger | 222/307 |
| 4,257,541 | 3/1981 | Souza | 222/362 |
| 4,345,700 | 8/1982 | Souza | 222/438 |
| 4,403,715 | 9/1983 | Ludovissie | 222/361 |
| 5,265,776 | 11/1993 | Shabestari | 222/454 |
| 5,411,186 | 5/1995 | Robbins, III | 222/442 |
| 5,421,491 | 6/1995 | Tuvim et al. | 222/336 |
| 5,489,049 | 2/1996 | Robbins, III | 222/448 |
| 5,509,582 | 4/1996 | Robbins, III | 222/158 |
| 5,588,563 | 12/1996 | Liu | 222/438 X |

*Primary Examiner*—Kevin P. Shaver
*Attorney, Agent, or Firm*—Ken J. Pedersen; Barbara S. Pedersen

[57] ABSTRACT

Embodiments of a measuring and dispensing device are described, for attachment to an open container for neat and consistent dispensing of particulate. The device has a generally cup-shaped dome with a swinging and lockable partition inside the dome for changing the volume inside the dome that receives particulate. A lid snaps onto the bottom of the dome to separate the dome interior space from the open container. To prepare the dispenser for receiving and measuring particulate, the dome is rotated relative to the lid to align an inlet port in the lid with the selected dome volume, and the container-dispenser unit is turned up-side-down. The dome then is rotated to close off the inlet port against a blocking surface, and the particulate is poured out through an uncapped outlet port. The device features simple, smooth construction, which results in easy cleaning and sanitary use.

14 Claims, 3 Drawing Sheets

PARTICULATE DISPENSER

BACKGROUND OF THE INVENTION

1. Field of the Invention.

This invention relates to a measuring and dispensing device for particulate material, for example, granular foods, such as dry baby formula, diet-plan milk-shake mix or coffee, etc. More particularly, this invention relates to a device that can be connected to an open can of granules or powder and can be adjusted to dispense a desired volume of the material to a bottle, bowl, or other container.

2. Related Art.

Various devices have been designed in the past for attachment to a jar or can for dispensing a volume of particulate material. Most devices dispense a set volume of particulate depending on the dimensions of the particulate-receiving compartment. Examples include Souza (U.S. Pat. No. 4,257, 541), Shabestani (U.S. Pat. No. 5,265,776), Robbins, III (U.S. Pat. No. 5,411,186), and Ludovissie (U.S. Pat. No. 4,403,715). U.S. Pat. No. 4,345,700 by Souza discloses a device which dispenses a variable quantity. Souza '700 includes an adjustment member which can be rotated to adjust the volume of the particulate-receiving compartment. Souza '700 features a top lid with a downward-protruding member that connects through a measurement unit to a bottom disk, and a spring loaded mechanism for biasing the lid-disk unit into an intake position. The Souza '700 adjustment member has a vertical wall for adjusting the volume of the receiving compartment and a horizontal wall for partially blocking the intake port when the adjustment member is in a position for reduced-volume dispensing.

What is still needed is a measuring and dispensing device that is simple and economical to manufacture, easy to clean, and effective in use.

SUMMARY OF THE INVENTION

This invention comprises a simple and effective device for attachment to an open can, jar or other container for neatly controlling the flow and volume of powder, granules, or other particulate from the container. An object of the invention is to provide a clean design with only a few parts, and all parts being easy to clean. Another object is to provide an effective dry storage and dispensing device that can be left on the particulate can to limit exposure of the particulate to humidity during storage and dispensing. Another object is to provide a device that is economical in its simplicity, for everyday use with containers such as those containing baby formula, "diet shake" powder, or coffee.

The device comprises a generally cylindrical dome member having an interior space, the dome being for placement on a container so that the interior space opens to the bottom. A blocking member protrudes down into the interior space, eliminating a portion of the interior space and providing a surface generally perpendicular to the axis of the dome and on a plane near the mouth of the dome. The blocking member takes up a fraction of the interior of the dome and leaves the remainder of the interior space for receiving particulate. A rotatable wall or paddle is inside the dome and rotatably mounted at or near the dome axis for partitioning the interior space to select the volume available to receive particulate.

The dispenser further comprises a bottom lid member which preferably is snapped over the rim of a particulate container. The lid is rotatably received in or near the mouth of the dome, parallel to and contacting the blocking surface in the interior space. The lid has a perforation which is an inlet port. When the dispenser is attached to the particulate container, the dome is manually rotated relative to the lid to register the inlet port with the particulate-receiving compartment. The container and dispenser are then inverted and particulate flows through the inlet port to fill the compartment. The dome is then manually rotated relative to the lid so that the inlet port registers with the blocking surface and the particulate-filled compartment is shutoff from the container. A cap is then removed from a spout or other outlet port in the selected compartment, and the particulate is shaken or poured into a cup, bottle, bowl, or other container.

The device may be made of few parts, preferably a pressed or molded dome member, a lid, an adjustment member with a locking mechanism, and a cap for an outlet port. The device may be made without springs or other biasing means and without crevices or layers of plastic which might collect food particles and bacteria. Washing the dispenser is simple, as the preferred lid may be snapped off of the dome to expose the rest of the particulate-contacting surface for cleaning.

DESCRIPTION OF THE PREFERRED EMBODIMENTS

Figure 1:
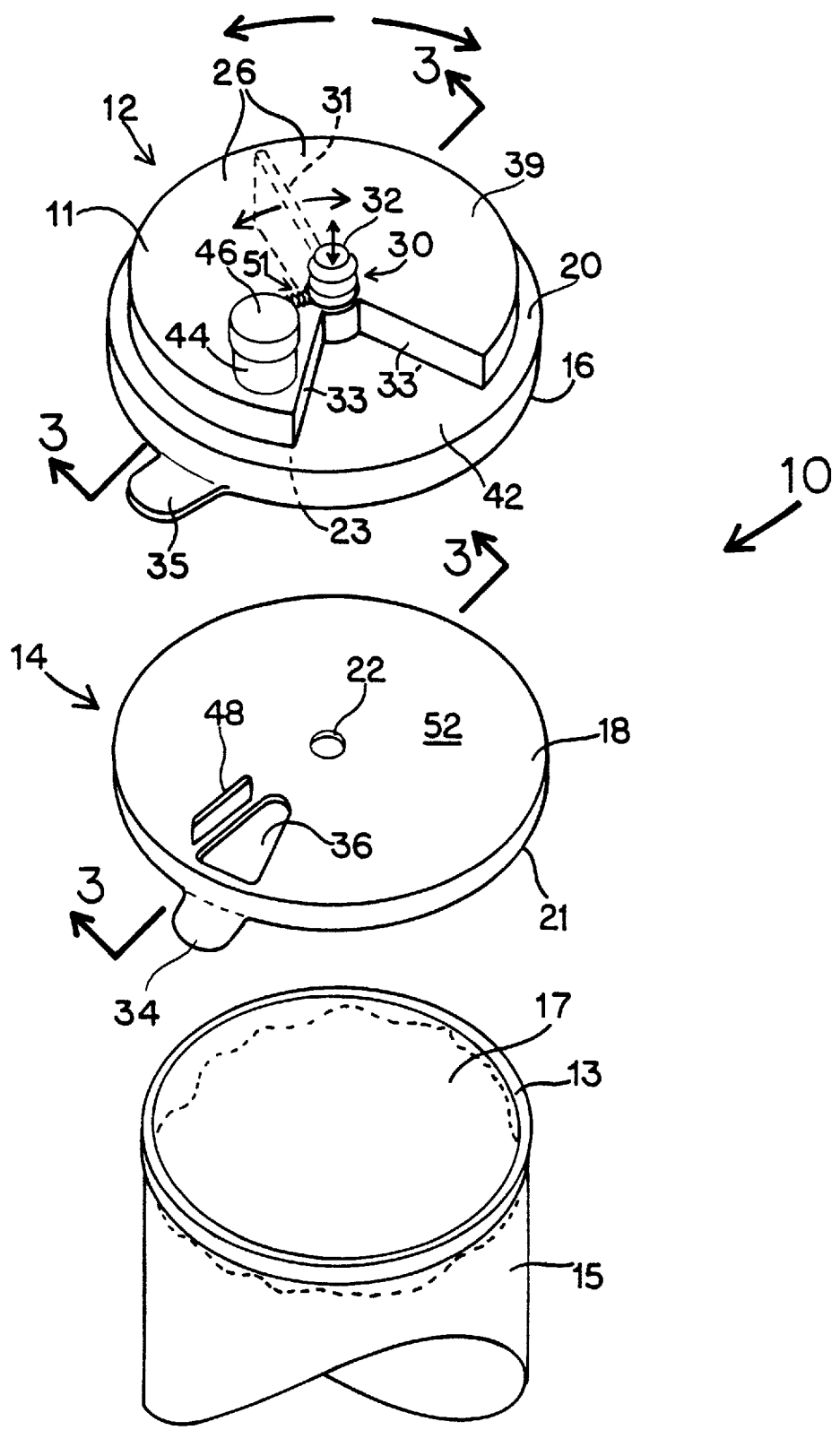
FIG. 1 is an exploded perspective view of one embodiment of the invention.
Figure 2:
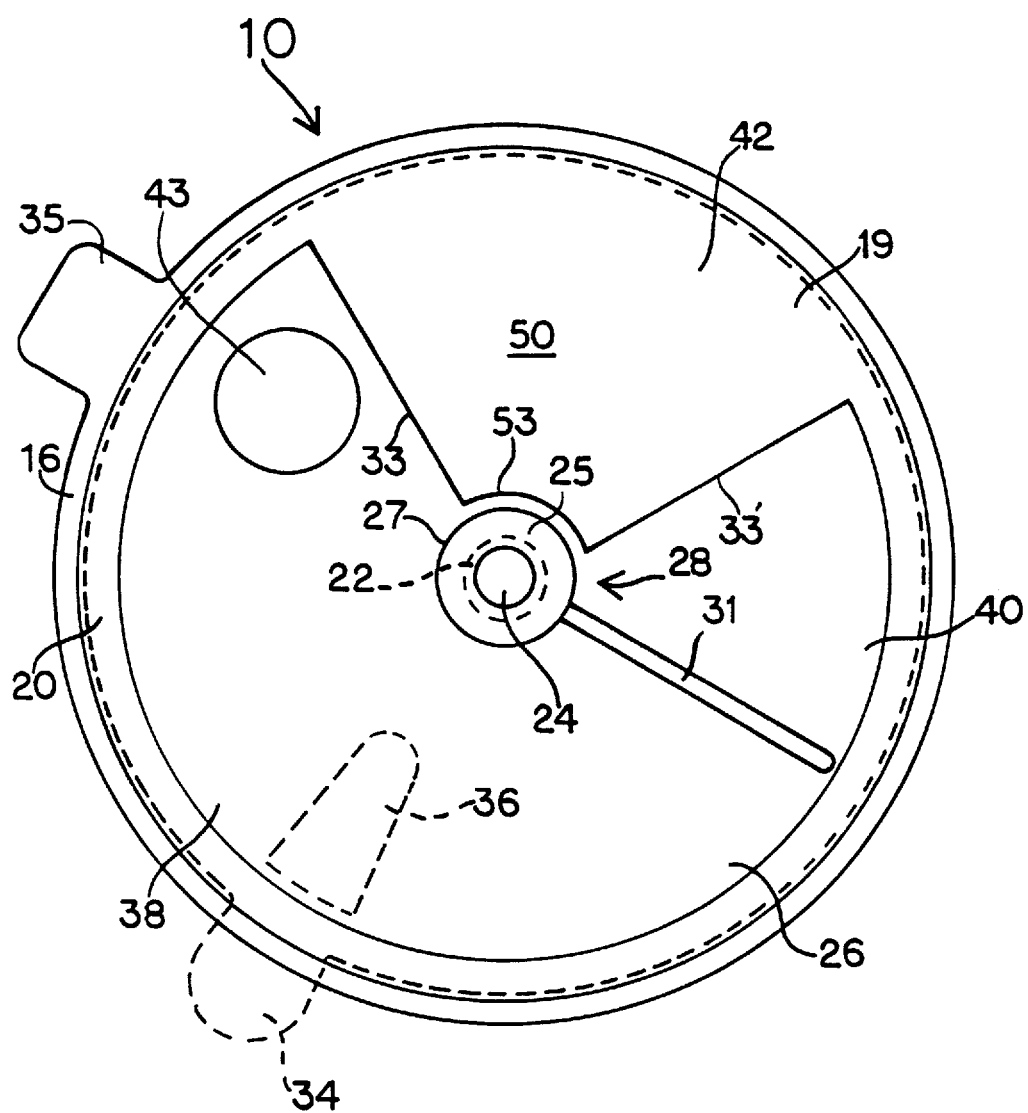
FIG. 2 is a bottom view of the embodiment of FIG. 1, with the lid shown in dashed lines with the inlet port open, and the partition in an alternative position.
Figure 3:
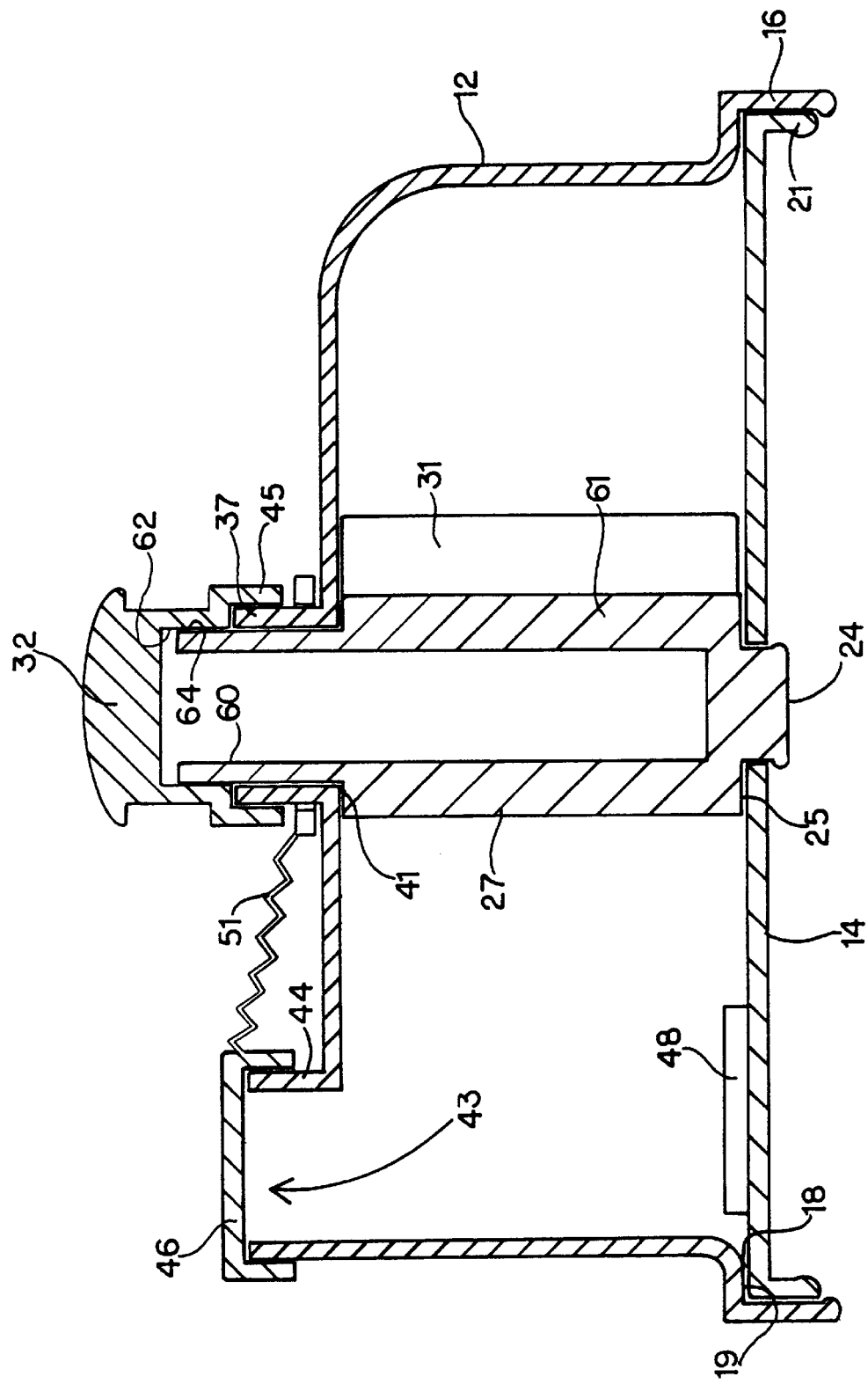
FIG. 3 is a cross-sectional view of the embodiment of FIG. 1, viewed along line 3—3 in FIG. 1, with the partition locked at the position shown in FIG. 1.

Referring to FIGS. 1 through 3, there is shown the preferred, but not the only, embodiment of the invented dispensing device. The dispensing device 10 comprises a generally cylindrical dome 12 and a generally circular lid 14, which may be snapped onto the rim 13 of an open can 15 containing powder 17. The outer diameter of the lid 14 is slightly smaller than the inner diameter of the dome 12, so that the lid 14 may be received inside the depending lip 16 to extend substantially across the mouth 23 of the dome. The upper surface outer perimeter 18 of the lid contacts the lower surface outer perimeter 19 of the dome wall 11, which in the preferred embodiment comprises an inside surface of the dome shoulder 20. Thus, the lid and dome outer perimeters contact to seal the lid to the dome to an extent that prevents particulate from escaping from between the lips 16, 21. Thus, the lip 21 of the lid 14 with the attached dome 12 preferably snaps down over the can, although other attachment means may be used to connect the dispenser 10 to a particulate container.

The lid 14 has a hole 22 at its axis which snaps around a button 24 or other protrusion from the bottom surface 25 of the rotating shaft 27 of the movable partition 28. The lid 14 is held on but can rotate around the button 24, so that the outer perimeter 18 of the lid upper surface 52 slides along the outer perimeter 19 of the dome lower surface. The snap-on connection of the lid 14 to the shaft 27 is preferably the only connection means for the lid 14, but others may be used. Optionally, an inwardly-extending ridge may encircle the inside surface of the dome lip 16 near the bottom end of the lip 16, to act as a restriction for helping to keep the lid 14 inside the dome lip. Optionally, a inwardly-extending ridge may encircle the inside surface of the lid lip 21 to assist in keeping the lid 14 on the can 15.

When the lid 14 is snapped off the dome 12, the interior space 26 of the dome 12 is exposed. In the preferred embodiment, the interior space 26 is approximately three-fourths of a generally cylindrical space. A protrusion 42 extends near the shaft 27 of the partition 28 to eliminate about one-fourth of the volume of a cylindrical volume shape. The three-fourths and one-fourth proportions may be different for various embodiments, resulting in varying fractions of interior space available for particulate-receiving and for blocking.

This protrusion 42 has two generally radially-extending vertical side walls 33, 33'spaced at approximately 90° and a generally flat bottom surface that acts as a blocking surface 50 to block the inlet port 36, which is preferably a wedge-shaped perforation in the lid 14. The blocking surface 50 is on a plane perpendicular to the axis of the dome 12 and approximately coplanar with the bottom surface 25 of the shaft 27, so that, when the lid 14 snaps around the button 24, the lid 14 is held with its top surface in contact with the blocking surface 50 and the lid is therefore rotatable around its axis in a plane just slightly below the plane of the blocking surface 50.

The interior space 26 may be described as a partial cylindrical volume, missing a segment which, in the preferred embodiment, is about 90°, but which may range in size down to a segment having a blocking surface just large enough to block the inlet port. The space 26 is divided into two portions by the partition wall or paddle 31 into a powder-receiving compartment 38 and an empty compartment 40. Rotating the partition 28, to place the paddle 31 at various angles in the space 26 relative to the first side wall 33', determines the volume of the powder-receiving compartment 38. The paddle 31 preferably is a substantially flat, planar surface, but, alternatively, may comprise generally a non-planar, curved, or otherwise shaped surface.

The partition 28 may be locked into place with the locking system 30 accessible outside and above the dome 12, at the top of the shaft 27. The lock button 32 at the top of the shaft 27, may be manually snapped up to free the partition 28 for rotation to a desired position. To lock the partition 28, the lock button 32 is pushed down, so that its lower generally cylindrical rim 45 snaps down around and frictionally engages a cylindrical neck 37. The cylindrical neck 37 upends from the top surface 39 of the dome and surrounds the hole 41 in the dome through which the shaft 27 extends. The rim 45 and neck 37 may have texture or knurling, for example, to facilitate a friction fit.

The partition 28, therefore, preferably comprises the paddle 31, the shaft 27 and the lock button 32. The shaft has a reduced-diameter upper portion 60 for extending into or through the hole 41 in the top of the dome 12, and a lower portion 61 from which the partition paddle 31 extends and which is retained in the interior space 26 by the dome wall. The lock button 32 is connected to the upper portion of the shaft 27 in such a way that, when the lock button 32 is unlocked, the button 32 and shaft 27 rotate together and, when the button 32 is locked, the button 32 and shaft 27 are both locked in the desired radial position. In the preferred embodiment, the button 32 and shaft 27 are connected so as to allow no rotation of the button 32 relation to the shaft 27, by means of hex-shaped mating surfaces on both the button 32 and the shaft upper portion 60. The hex-shaped inside surface 62 of the button 32 frictionally receives the hex-shaped outer surface 64 of the shaft upper portion 60, to radially capture the upper portion 60 The button 32 is tight enough on the shaft upper portion 60 to keep them together during normal use, but is removable with a firm pull to allow removal of the partition 28 from the dome 12 for complete cleaning. Alternatively, the button may be attached to the shaft by a variety of other means, such as a non-rotatable snap-on design, adhesive, welding, etc.

The shaft 27 preferably is in close but slideable contact with the end 53 of the protrusion 42 so particulate does not leak past the shaft into the empty compartment 40. Also, the shaft preferably is just slightly smaller than the hole 41 to minimize the amount of particulate that may migrate through the hole 41.

The outlet port of the dispenser comprises a hole 43 or other perforation through the dome wall and has a neck 44 surrounding it for dispensing powder from the compartment 38. A cap 46 may be snapped onto the neck 44 to prevent powder from exiting the powder-receiving compartment 38 via the outlet port until the user wishes to empty the dispenser 10. The cap 46 may have a plastic or other tether connecting it to the dispenser 10. In the preferred embodiment, the tether is a pleated strap 51 of plastic integrally extending from the cap 46 to a removable ring around the neck 37.

In use, the dispenser 10 is assembled into a single unit, by snapping the lid 14 onto the dome 12, and installed on an open can 15. The embodiment shown in FIGS. 1–3 may be sized to fit on the outside of various cans, and may have tabs 34, 35 extending from the horizontal extents of the lid 14 and dome 12, respectively, for assisting in snap-on, rotation, and removal from the can 15. Preferably, the dispenser is sold with one dome and two lids for alternative use depending on what particulate can is being used. In such an embodiment, the two lids have the same outer diameter for fitting into the dome, but the thickness of the lid lip 21 is different in each lid, so that the two lids have different inner diameters to fit cans with different outer diameters.

Alternatively, the dispenser 10 may be designed without the tab 34 so that the lid 14 can be frictionally installed inside the rim 13 of the can, rather than outside. In such an embodiment, the inner diameter of the dome lip 16 friction fits over the outer diameter of the can. Thus, the lid 14 is inside the can rim and the dome 12 is outside the can rim, resulting the can rim being between the lid and the dome.

To fill the dispenser 10, the volume of the powder compartment 38 is set preferably in advance by adjusting the partition 28 position relative to the sidewall 33. Then, the dome 12 is rotated relative to the lid 14, before or after installation on the can, to a position in which the inlet port 36 is registered with the powder-receiving compartment 38. In the embodiment in FIGS. 1–3, the two tabs 34, 35 are positioned so that, when they are aligned with each other, the inlet port 36 is registered with the powder-receiving compartment 38 approximately directly under the outlet port hole 43. With the cap 46 snapped onto the neck 44, the can-dispenser unit is then turned upside down and gravity fills the powder-receiving compartment. While still in the inverted position, the dome is rotated relative to the lid, so that the inlet port 36 is registered with and blocked by the blocking surface 50. The can-dispenser unit is then inverted back to an upright position, the powder-receiving compartment 38 is then opened to the outside by removing the cap 46. The can-dispenser unit is tipped or inverted again to pour out the powder by gravity into a bowl, glass, or other container for use in making a beverage or other food.

The outlet port hole 43 is preferably close to the sidewall 33, and when the paddle 31 is locked closely adjacent to the hole 43, the dispensed dose is the smallest practical dose, equal to the volume of a portion of the interior space approximately the width of the outlet port hole. The largest dose, on the other hand, is available when the partition is locked closely adjacent to wall 33', so that nearly all of the interior space 26 receives and dispenses powder.

Optionally, the lid may have a ridge 48 or other protrusion upending from the upper surface 52 of the lid 14, for acting as a limit to the relative movement of the lid and dome. The ridge 48 extends generally radially along the upper surface 52 and is located about ⅓ inch clockwise from the inlet port 36, as viewed from the top of the plate 14. The ridge 48 may stop against wall 33 to ensure that the inlet port doesn't rotate past the blocking surface 50. Also, the ridge 48 may stop in the other direction against the paddle 31 to ensure the inlet port doesn't rotate past the selected powder-receiving compartment 38 into the empty compartment 40 when the dispenser 10 is being set to receive powder.

If the user wishes to pour directly from the container 15 through the dispenser 10 to a receptacle, the user may rotate the dome to align the inlet and outlet ports and leave the cap 46 off. Thus, powder can be poured from the can 15 out and through the dispenser, without any 30 measuring.

The dispenser 10 is preferably made of injection-molded polypropylene (PP) or polyethylene (PE) plastic. The dome 12 is preferably a single sheet of plastic curved into the appropriate shape. Likewise, the lid 14 is preferably a single sheet of plastic curved into the appropriate shape. The preferred simple design of the dome and lid, without crevices, sharp corners, or multiple layers, makes an easily-cleanable dispenser. The partition 28 preferably is also made of PP or PE of an opaque color, so it is easily visible through the clear lid and dome. The dome wall 11 may include markings for measurement, for example, indicating tablespoons or fractions of a cup, for reference when adjusting the partition 28.

Although this invention has been described above with reference to particular means, materials and embodiments, it is to be understood that the invention is not limited to these disclosed particulars, but extends instead to all equivalents within the scope of the following claims.

I claim:

1. A dispenser for connection to a particulate container, the dispenser comprising:
   a dome having a dome wall defining an interior space and a mouth into said interior space, and having an axis, a lower surface with an outer perimeter, an outlet port perforation;
   a cap for covering said outlet port perforation; and
   a hole through the dome wall near the dome axis;
   a generally circular lid having an axis and an upper surface with an outer perimeter, an inlet port perforation, and means for connecting the lid to the particulate container;
   means for connecting the lid to the dome substantially across the dome mouth, so that the dome is coaxial with and rotatable relative to the lid and so that the lid upper surface outer perimeter and dome lower surface outer perimeter are in slideable contact;
   a protrusion into the interior space, the protrusion having a lower blocking surface contacting the lid upper surface; and
   a partition comprising:
      a shaft rotatably mounted in the interior space and having a shaft upper portion rotatably extending into the dome wall hole;
      a paddle rigidly connected to and extending out from the shaft and across the interior space toward the dome wall for dividing the interior space into a particulate-receiving compartment and an empty compartment; and
      a means for locking the paddle in a desired radial position in the dome interior space to determine the relative size of the particulate-receiving and empty compartments;
   wherein the dome is rotatable relative to the lid in order to register the inlet port perforation with the particulate-receiving compartment for filling the particulate-receiving compartment with particulate, and in order to register the inlet port perforation with said blocking surface for preventing particulate from falling out of said particulate-receiving compartment; and
   wherein the cap is removable to allow particulate to exit the particulate-receiving compartment through the outlet port perforation.

2. A dispenser as set forth in claim 1, wherein the partition consists only of said shaft, said paddle, and said locking means, and wherein said paddle consists of a substantially planar wall.

3. A dispenser as set forth in claim 1, wherein the dome wall further comprises a cylindrical neck upending around the dome wall hole and the locking means comprises locking button connected to said shaft upper portion, the locking button having a lower rim for frictionally engaging the cylindrical neck.

4. A dispenser as set forth in claim 1, wherein the means for connecting the lid and the dome comprises a protruding member extending from the shaft and a lid hole near the lid axis, and wherein the lid is snapped onto the protruding member so that the lid is rotatably connected to the dome.

5. A dispenser as set forth in claim 1, wherein the dome is clear material and the partition is colored, opaque material.

6. A dispenser as set forth in claim 1, wherein the dispenser further comprises a tether for connecting the cap to the dome.

7. A dispenser as set forth in claim 1, wherein the dispenser does not comprise a spring.

8. A dispenser as set forth in claim 1, wherein the dome wall consists of a single curved sheet.

9. A dispenser for connection to a particulate container, the dispenser consisting of:
   a dome having a dome wall defining an interior space and a mouth into said interior space, and having an axis, a lower surface with an outer perimeter, an outlet port perforation;
   a cap for covering said outlet port perforation; and
   a hole through the dome wall near the dome axis;
   a generally circular lid having an axis and an upper surface with an outer perimeter, an inlet port perforation, and means for connecting the lid to the particulate container;
   means for connecting the lid to the dome substantially across the dome mouth, so that the dome is coaxial with and rotatable relative to the lid and so that the lid upper surface outer perimeter and dome lower surface outer perimeter are in slideable contact;
   a protrusion into the interior space, the protrusion having a lower blocking surface contacting the lid upper surface; and
   a partition comprising:
      a shaft rotatably mounted in the interior space and having a shaft upper portion rotatably extending into the dome wall hole;

a paddle rigidly connected to and extending out from the shaft and across the interior space toward the dome wall for dividing the interior space into a particulate-receiving compartment and an empty compartment; and a means for locking the paddle in a desired radial position in the dome interior space to determine the relative size of the particulate-receiving and empty compartments;

wherein the dome is rotatable relative to the lid in order to register the inlet port perforation with the particulate-receiving compartment for filling the particulate-receiving compartment with particulate, and in order to register the inlet port perforation with said blocking surface for preventing particulate from falling out of said particulate-receiving compartment; and wherein the cap is removable to allow particulate to exit the particulate-receiving compartment through the outlet port perforation.

10. A dispenser as set forth in claim 9, wherein the partition consists only of said shaft, said paddle, and said locking means, and wherein said paddle consists of a substantially planar wall.

11. A dispenser as set forth in claim 9, wherein the dome wall further comprises a cylindrical neck upending around the dome wall hole and the locking means comprises locking button connected to said shaft upper portion, the locking button having a lower rim for frictionally engaging the cylindrical neck.

12. A dispenser as set forth in claim 9, wherein the means for connecting the lid and the dome comprises a protruding member extending from the shaft and a lid hole near the lid axis, and wherein the lid is snapped onto the protruding member so that the lid is rotatably connected to the dome.

13. A dispenser as set forth in claim 9, wherein the dome and lid are clear material and the partition is colored, opaque material.

14. A dispenser as set forth in claim 9, wherein the dome wall consists of a single curved sheet.

* * * * *